United States Patent [19]
Wrobel et al.

[11] Patent Number: 5,170,086
[45] Date of Patent: Dec. 8, 1992

[54] ELECTRIC MOTOR WITH TOOTHED DISK TO SECURE STATOR CORE

[75] Inventors: Günter Wrobel; Michael Hermann, both of Villingen-Schwenningen, Fed. Rep. of Germany

[73] Assignee: Papst Motoren GmbH, Fed. Rep. of Germany

[*] Notice: The portion of the term of this patent subsequent to Dec. 7, 2008 has been disclaimed.

[21] Appl. No.: 696,783

[22] Filed: May 7, 1991

Related U.S. Application Data

[63] Continuation-in-part of Ser. No. 382,628, Aug. 9, 1989, Pat. No. 5,013,957.

[51] Int. Cl.⁵ .......................... H02K 7/14; H02K 1/06
[52] U.S. Cl. .................................. 310/217; 310/67 R
[58] Field of Search ............... 310/42, 43, 217, 67 R, 310/45

[56] References Cited

U.S. PATENT DOCUMENTS

| | | | |
|---|---|---|---|
| 1,192,404 | 7/1916 | Ewart | 310/217 |
| 1,467,938 | 9/1923 | Janette | 310/217 |
| 3,002,118 | 9/1961 | Papst | 310/61 |
| 4,604,665 | 8/1986 | Müller et al. | 310/67 R |
| 4,682,065 | 7/1987 | English | 310/67 R |
| 4,814,652 | 3/1989 | Wright | 310/67 R |
| 4,858,044 | 8/1989 | Crapo | 310/268 |
| 4,934,041 | 6/1990 | Hoover et al. | 310/42 |
| 5,005,281 | 4/1991 | Burns | 310/42 |
| 5,013,957 | 5/1991 | Wrobel | 310/217 |

Primary Examiner—Steven L. Stephan
Assistant Examiner—C. LaBalle
Attorney, Agent, or Firm—Barnes & Thornburg

[57] ABSTRACT

In an electric motor, a springy disk with internal projections is used to position the iron stator plates of an electric motor by engagement with a soft material of the electric motor bearing support part. The disk is thus fixed with plates of the stator to align the stator plates with the support tube. The disk can be held between an end plate of the stator and the iron plates by windings of the motor. The disk can have tabs or ribs to align the plates properly or can have a pole configuration similar to the plates themselves. Indexing ribs can be located between the disks and the support plate.

37 Claims, 5 Drawing Sheets

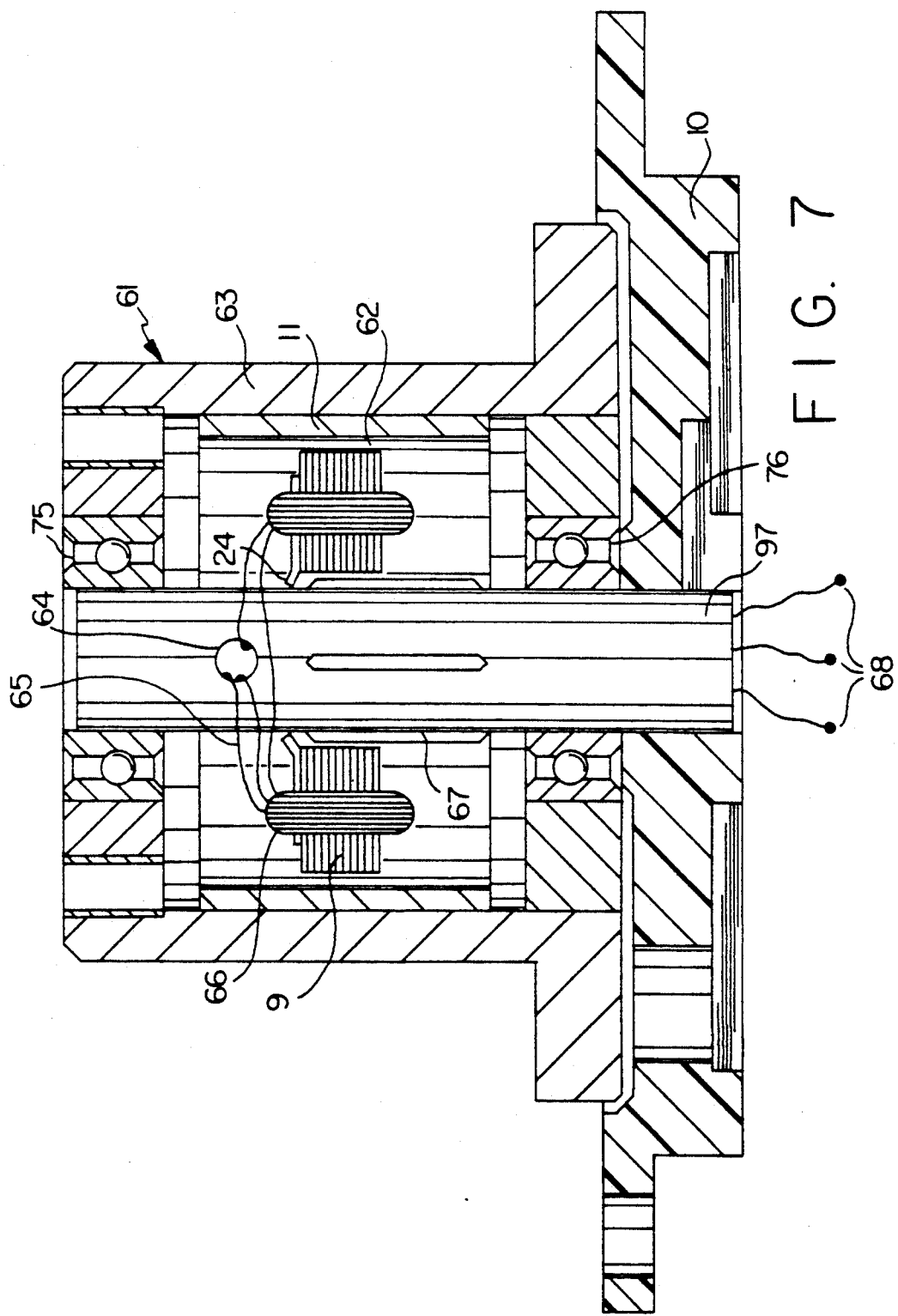

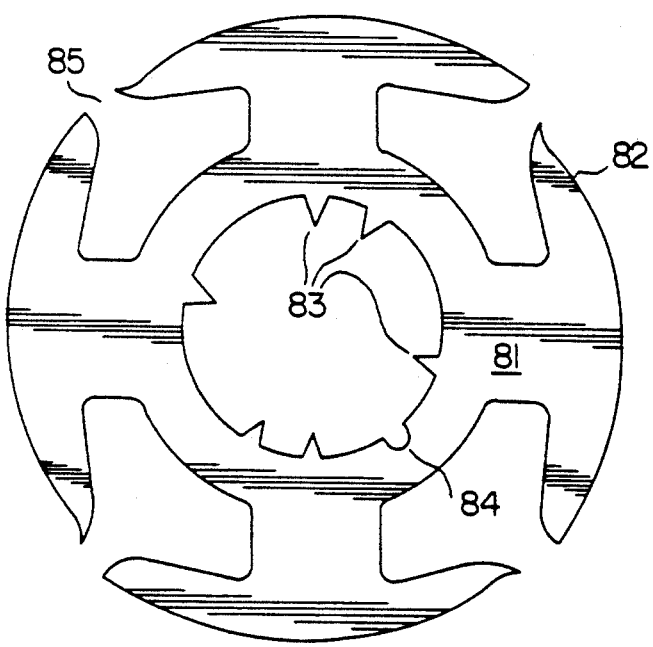
F I G. 8A
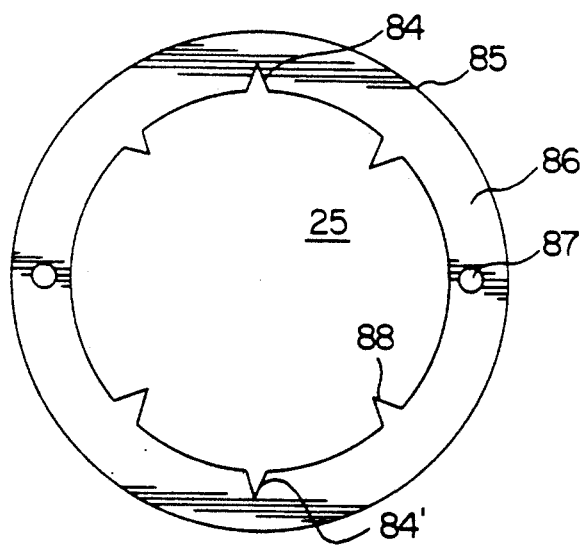
F I G. 8B
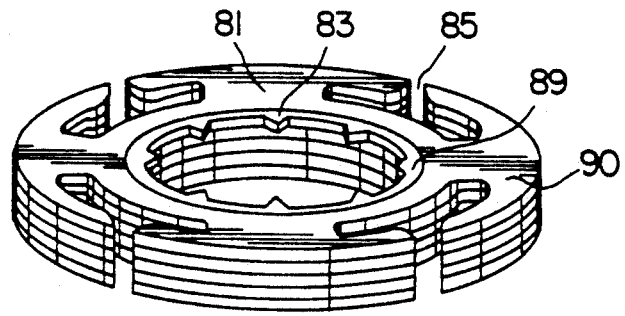
F I G. 8C

ELECTRIC MOTOR WITH TOOTHED DISK TO SECURE STATOR CORE

BACKGROUND AND SUMMARY OF THE INVENTION

This application is a continuation-in-part of my co-pending U.S. patent application Ser. No. 07/382,628 filed Aug. 9, 1989 and now U.S. Pat. No. 5,013,957 issued May 7, 1991.

The invention relates to an electric motor having a fastening flange and a bearing support part made of a plastic material or a soft metal. The motor stator is fastened on an outer diameter of the bearing part.

As a rule, the stators of electric motors of this type are glued on a bearing support part. Before the hardening of the adhesive agent of the glue, the stator must be aligned, and it must remain in this position until the hardening is completed. The apportioning of the adhesive agent must take place relatively precisely since, due to the small play between the inside diameter of the stator iron and the outer jacket of the bearing support part, only a small amount of this adhesive agent is required. It is an important disadvantage that the adhesive agent of the adhesive layer when, for example the bearing support part is pushed on, is pressed away so that no apportioned amount of adhesive agent remains.

The invention is based on the object of eliminating the disadvantages which arise as a result of the gluing and at the same time reducing the costs for the manufacturing of such electric motors. This is accomplished by means of a very simple mounting.

According to the invention, this object is achieved for an electric motor of the initially mentioned type by arranging a metal toothed disk at the end of the stator iron on the side away from the flange. Said toothed disk has radially inwardly extending projections which are in external contact with the bearing support part and hold the stator.

By means of a simple axial pressing-on step, the construction of the inventive stator results in the simultaneous fastening and alignment of the stator at the bearing support part.

The fastening device provided in the invention is a simple toothed disk made of strip steel. The equidistantly arranged teeth of the toothed disk are made of iron, e.g. thin spring steel or strip steel, or hard copper, which is thin elastic and hard, and which are bent away as a result of a residual spring action to hook themselves in the plastic material of the bearing support part when the stator is pressed on the bearing support part. Because of the selected plate thickness of, for example, approximately 0.2 mm, the teeth do not have to be bent forward and then mounted. Additionally, good results are obtained even if the teeth are not equidistanly spread about the disk.

At least one tongue, which projects beyond the outer edge of the toothed disk, fixes this toothed disk in a position which is appropriate for mounting. Because of the winding spindle, the teeth should always have the same position. Instead of an outwardly extending tongue, indexing grooves can be located in the inside of the disk for alignment with a rib on the supporting tube structure.

A groove, which extends in axial direction in the inside bore of the stator iron, acts in conjunction with an axial cam, extending axially on the outer jacket of the bearing support part, to prevent any twisting of the stator.

Ideally the core plates are coated with a plastic through a fluidized bed sintered layer and the teeth are uncoated so as to allow sharp projections on the teeth of the toothed disk as well as to provide proper insulation against short circuits with the windings. This allows for a core plate to have the teeth on its inside edge rather than have a separate toothed disk. This same unitary construction is possible for a core end plate which is plastic coated with internal teeth.

For the radial alignment and improved centering, at least three ribs are injection-molded to the outer jacket of the bearing support part, are approximately uniformly distributed over the circumference, and extend in parallel to the axis of the inside bore of the bearing support part.

The toothed disk can be inserted between the stator iron and the end plate of the winding and is held by the winding of the stator and thus also by the end plates of the winding. At the same time, the disk is insulated in the direction of the winding wire.

Alternatively, the disk can be located at one end of the stator-core to act as an end plate therefore. It is also possible to have the disk sandwiched in-between plates of the core.

An axially short smaller diameter of the outer jacket is provided at the end of the bearing support part on the side away from the flange to facilitate the mounting and provide a space for the raising of the teeth.

Where the bearings are located outboard of the winding on a fixed hollow shaft, the disks can bear into the shaft itself as well as acting as end plates for the windings. The disk can be used on all types of motors, including reluctance type motors having four poles.

The invention can be used on small fan motors or motors that drive computer hard, floppy or optical disks and magnetic tape spools for date storage equipment.

Other objects, advantages and novel features of the present invention will become apparent from the following detailed description of the invention when considered in conjunction with the accompanying drawings.

BRIEF DESCRIPTION OF THE DRAWINGS

FIG. 7 is a sectional view of an electric motor according to the invention wherein bearings are located outboard of the windings and a hollow bearing support tube is provided for supplying electrical connections to the motor;

FIG. 8a shows a fastening element including elements of the iron core;

FIG. 8b shows a fastening element with internal indexing recesses, and

FIG. 8c shows the fastening element located within the iron core, which iron core is covered with a sintered bed layer.

DETAILED DESCRIPTION OF THE DRAWINGS

Figure 1:
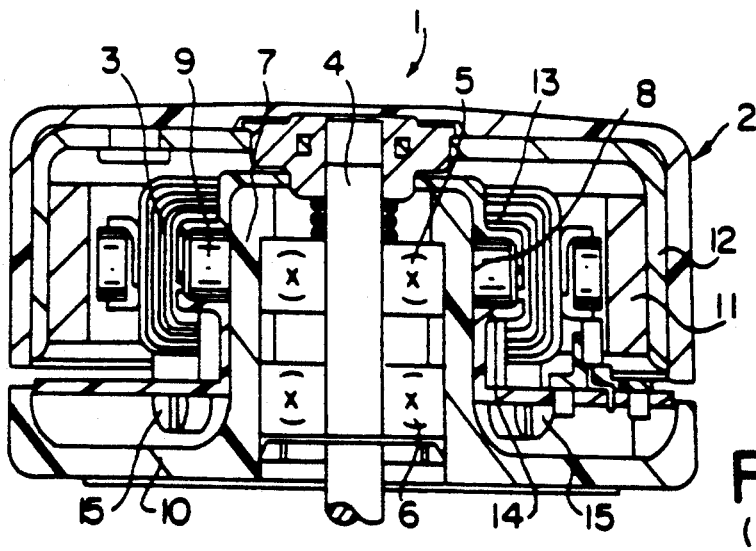
FIG. 1 is a sectional view of a known electric motor.

FIG. 1 shows a known electric motor 1 consisting of a rotor 2 and a stator 3. A shaft 4 is disposed in bearings 5, 6.

In the embodiments (FIGS. 1-6), ball bearings 5 are shown which are fastened in a bearing support part 7 made of a plastic or soft metal (diecasting). However, sliding bearings may also be used. An iron core 9 (normally composed of a plurality of plates) of the stator 3 is glued on an outer jacket 8 of the bearing support part 7. A fastening flange 10 is used for the fastening of the electric motor 1. In FIG. 1, the bearing support part 7 and the fastening flange 10 are constructed as a one-piece plastic molded part. The drop-shaped rotor 2 of the brushless direct-current motor shown, consists essentially of a permanent magnet 11 and a return flow pot 12, in the bottom of which, an end of the shaft 4 is concentrically fastened. The stator iron core 9, which is constructed as a bundle of plates, is covered on both sides (in axial view) by the winding end plate 13, 14 respectively made of plastic. The lower end plate 14 contains at least three slotted supports 15 which are arranged approximately in parallel with the axis. Among other things, the supports 15 are used for the fastening of a printed circuit board 16 which contains the electronic control system for the operation of the electric motor 1.

Figure 2:
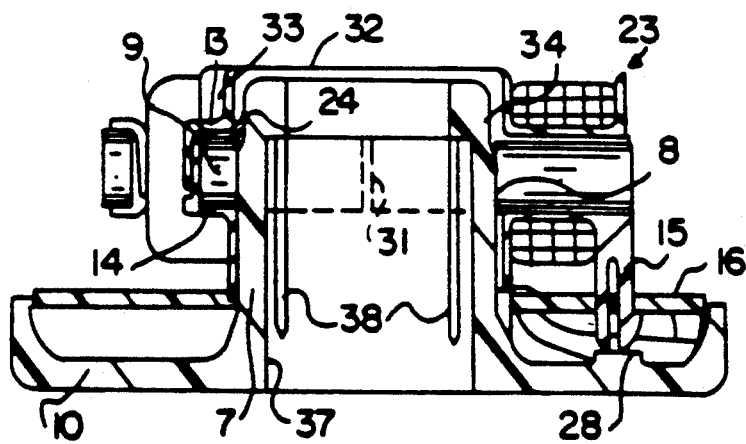
FIG. 2 is a sectional view of a stator for an electric motor according to FIG. 1 mounted according to the invention.
Figure 3:
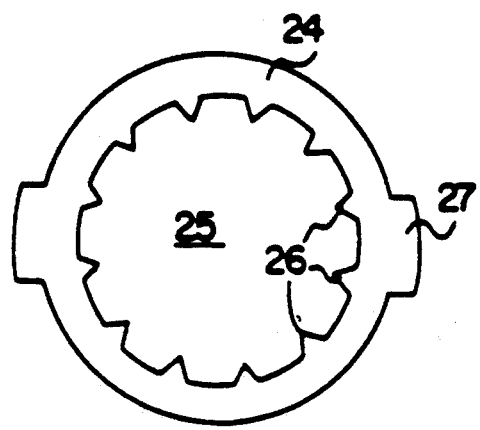
FIG. 3 is a top view of a fastening element used in the invention.

FIG. 2 shows a stator 23, which corresponds essentially to the stator 3 shown in FIG. 1. For this reason identical parts or parts which have the same effect are provided with the same reference numbers. The significant difference is the devices for the fastening of the stator iron 9 on the outer jacket 8 of the bearing support part 7. A toothed disk 24 made of thin spring steel or strip steel with a plate thickness of approximately 0.1 to 0.3 mm and with a central bore 25 is provided with at least three pointed teeth 26 at the inner edge which are arranged and directed radially to the center of the bore. At least one tongue 27 (in the present example, two tongues) is used for the securing of the toothed disk 24. It projects between the fitted-together winding end plates 13, 14. The outer extent of the bore 25 has a somewhat larger diameter than the outer jacket 8 of the bearing support part 7, while the teeth 26, which project radially toward the inside, are equidistantly arranged on the inner edge.

When the stator parts are assembled, the toothed disk 24 is first placed on the one end of the stator iron core 9, the upper winding end plate 13 is fitted over it, and the lower winding end plate 14 is connected with the upper end plate 13 by means of a sliding fit from the direction of the other end of the stator iron 9. Then the stator 23 is wound. The winding firmly connects the two end plates 13, 14 and the toothed disk 24 with one another by means of the end plates 13, 14. Then the mounted stator 23 is slid over the outer jacket 8 of the bearing support part 7 with a slight pressure, until the lower ends of the supports 15 rest against corresponding stop surfaces 28 of the flange 10.

The sliding pressure is exercised on the upper edge 32 of the upper end plate 13. For reinforcing, at least three ribs 33 are injection-molded on this edge 32 to provide for stiffening. When the stator 23 is pushed on, the teeth 26 of the toothed disk 24, which preferably consists of spring steel or strip steel with a thickness of 0.2 mm, are bent away and, after the pressing-in operation is completed, dig themselves into the outer jacket 8 of the bearing support part 7 made of a plastic material or a soft metal, as a result of the spring-back effect generated during the bending-away. This simple and secure fastening for a stator on a supporting part is not limited to supporting parts 7 made of a plastic material, but can be used anywhere where the supporting part 7 consists of a softer material than the toothed disk 24; i.e., of a material into which the toothed disk can penetrate at least slightly. Examples of such material are "Zamak" (ZnAL-4) or aluminum.

An axial pressure is generated from above which affects the inside diameter area of the bundle of plates of the stator iron 9. The counterpressure from below takes place at the outer diameter area of the bundle of plates of the stator iron core 9 since the supports rest against the stop surfaces 28. The spring-back force of the bundle of plates of the stator iron core 9, which are bent slightly downward at the inside diameter area, seeks to return into a starting position and, as a result, additionally presses the teeth 26 of the disk 24 essentially in axial direction into the outer jacket 8 and thus prevents any axial play.

For simplifying the mounting, the outer jacket 8 of the bearing support part 7, at its upper end (FIG. 2), i.e., on the side facing away from the flange, has an axially short area 34 of a smaller diameter. As a result, the stator 23, without tilting, can be fitted without any effort and subsequently can be pushed onto the precisely fitting outer jacket part 8 of the bearing support part 7. For the circumferential fixing and for preventing twisting, an axially extending groove 31 is provided in the inner bore of the stator iron core 9 and a correspondingly adapted axial cam 35 (FIG. 5) is provided on the outer jacket 8.

The short area 34 of a smaller diameter at the outer jacket 8 of the bearing support part 7 will not be necessary, however, if the clearance between the inside diameter of the end plate 13 and the diameter of the outer jacket 8 is large enough to ensure a bending of the teeth 26 of the toothed disk.

The slightly conical shape of the outer jacket 8 of the bearing support part 7 caused by manufacturing is eliminated by at least three ribs 36 (FIG. 5) which are parallel to the axis of the bearing support 7 and which are molded on and distributed over its circumference. This further improves the centering and the alignment of the stator 3, 23 with respect to the bearing bore 37. Ribs 38, which are parallel to the axis and center the bearings 5, 6 to be inserted, are also injection-molded on at the wall of the bearing bore 37 which is made conical.

Figure 4:
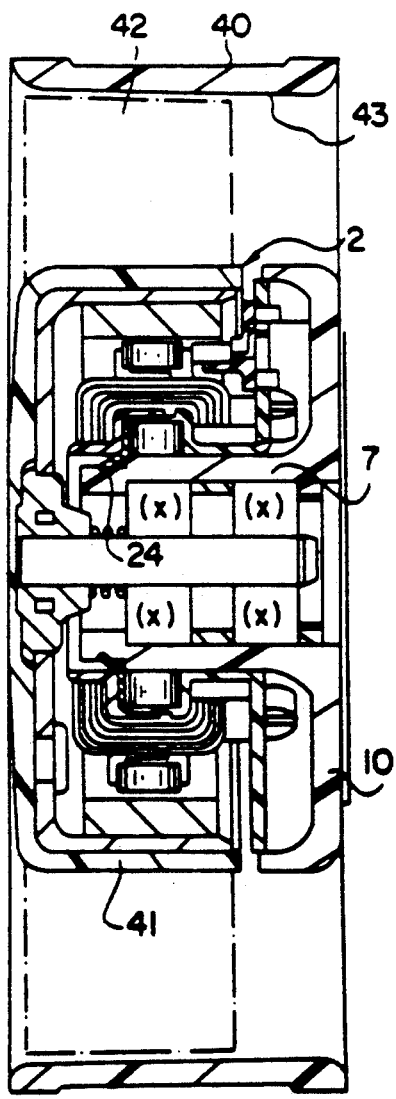
FIG. 4 is a sectional view of an electric motor according to the invention with a mounted stator installed into an axial fan.
Figure 5:
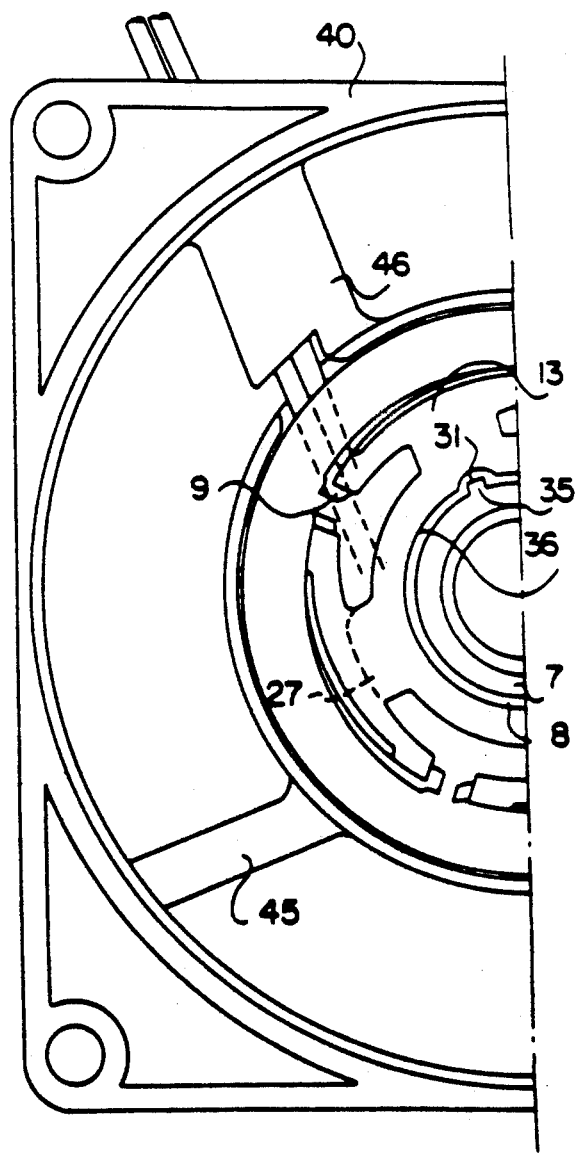
FIG. 5 is half a top view of an axial fan without the rotor.

FIGS. 4 and 5 shows a typical fan application of electric motors according to the invention. The axial fan consists of a one-piece plastic injection-molded housing 40 which contains the flange 10, webs 45, 46 and the bearing support part 7. An impeller 41 with blades 42 for moving the air current through a flow duct 43 is mounted on the rotor 2. Such fans are very compact (the representation in these FIGS. 4, 5 is approximately twice the size of the object itself) and as a mass-produced product, are simple and reasonable in price. The stator 3, which previously had been mounted by means of gluing, is replaced by the stator 23 which, according to the invention, can be mounted in a simpler and more secure manner. This reduces the costs even more, which is important for this type of a mass-produced product.

When the stator is pressed by a force F1 on the interior area of the bundle of plates of the stator iron core 9, the bundle of plates is bent downward by means of a counterpressure by force F2. During spring-back, the teeth 26 are additionally pressed into the outer jacket 8, eliminating any axial play.

Figure 6:
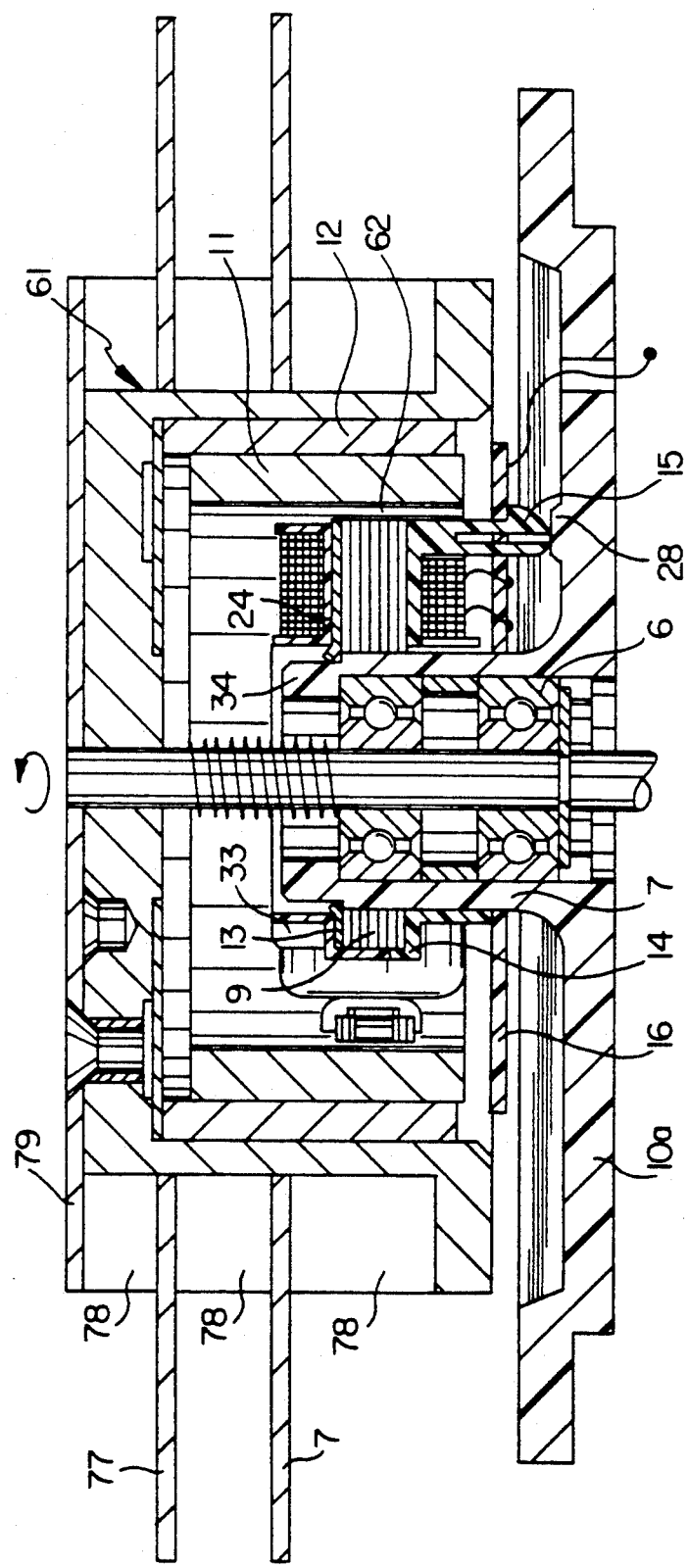
FIG. 6 is a sectional view of an electric motor according to the invention used for driving a hard disk drive for a computer.

In FIG. 6 a disk drive for a computer is shown. Here the motor drives a hub 61 that holds magnetic or optical disks 77 which are spaced by spacer rings 78 and held together by a clamping lid 79. The magnetic flow element 12 is of cylindrical shape. Also provided is an air gap 62 between the stator and a permanent magnet 11. The fastening flange 10(a) is generally flat and normally machined at its attachment points for precision locating of the motor.

FIG. 7 shows a motor similar to that of FIG. 6, but without a magnetic flow element 12. Here, the bearings 75, 76 are located outboard of the stator 9 and windings 66 on a hollow bearing support 97. Ribs 67 are located on the hollow bearing support 97 for cooperation with recesses in the iron core of the stator 9 for positioning of the core with respect to the support.

Here the disk 24 acts as an end plate for the core and is wound with the core plates by the windings 66. There is no end plate below the iron core, since the windings alone hold the iron core plates. The bearing support 97 is a hollow cylinder provided with an internal passageway that connects with hole 64. Wires 65 connect the windings to coil terminals 68 via the hole 64 and hollow interior of the support 97. If desired a plastic coating can be applied around the stator to additionally secure the plate together and provide for protection of the windings 66 against piercing. The elongated body 63 of the hub 61 is shown without disks located thereon, but such can be located as shown in FIG. 6.

Various configurations for the disk 24 can be utilized in different applications and motor structures. FIG. 8a shows the outer extremity of the disk 81 configured as iron core plate for a so called reluctance motor having pole contours 82, winding necks 91 and gaps 85. Here the teeth 83 are not located uniformly about the interior of the disk 81, but rather are located at clock hour positions 12, 1, 3, 6, 7 and 10. A recess 84 is provided for indexing the disk 81 on the bearing support 77. No tabs 27 are necessary since the pole contours 82 will align themselves with the remaining core plates as the iron core is wound. Alternatively this disk 81 could be an end plate.

FIG. 8b shows a disk 86 with two aligning recesses 84 and 84'. Here there are four equally spaced teeth 88. Dimpled recesses 87 are provided for handling and positioning of the disks by robot assembly arms. These dimples could also be holes to accept tools attached to the robots and could also be used for positioning on the iron core.

FIG. 8c shows a modification of the disks shown in FIG. 8a. Here the teeth 83 are uniform. The outer sides 90 of the disks are coated with a plastic fluidized bed sinter layer while the inner area 89 is not so coated so as to allow for sharpness of the teeth 83. While the disk is shown as an end plate it could of course be an internal plate in the iron core.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An electric motor for use in a coded disk drive for data storage having:
   a mounting plate;
   a bearing support part made of deformable material
   a rotor surrounding a stator;
   the stator having at least one winding end plate and an iron core axially secured about an outer diameter of the bearing support part at a side facing away from the mounting plate;
   a toothed disk having a central bore surrounding the diameter of the bearing support part and having radially inwardly projecting projection means which are in external contact with the bearing support part to axially fasten the stator to the bearing support part;
   wherein the toothed disk has at least one tongue means protruding beyond an outer edge thereof for connecting and aligning the toothed disk to the stator;
   wherein the toothed disk is held between the at least one winding end plate of the stator and the iron core by an electrical winding; and
   wherein the motor is used to drive a cylindrical hub provided to carry a number of coded disks.

2. An electric motor for use in a coded disk drive for data storage such as a hard-disk drive or an optical disk drive, having:
   a mounting plate;
   a bearing support part made of deformable material;
   a rotor surrounding a stator;
   the stator having an iron core made up of plates axially secured by first securement means about an outer diameter of the bearing support part at a side facing away from the mounting plate and comprising plates which are axially secured by second securement means;
   a toothed disk representing the first securement means, having a central bore surrounding the diameter of the bearing support part and having radially inwardly projecting projection means which are in external contact with the bearing support part to axially fasten and align the stator to the bearing support part;
   wherein the toothed disk has at least one tongue means protruding beyond an outer edge thereof for connecting and aligning the toothed disk to the stator;
   wherein the toothed disk is held against the iron plates of the iron core of the stator by the second securement means; and
   wherein the motor is used to drive a cylindrical hub provided to carry a number of coded disks.

3. An electric motor according to claim 1, having a magnetic return flow element of cylindrical configuration between the iron core and the hub.

4. An electric motor according to claim 2, having a magnetic return flow element of cylindrical configuration between the iron core and the hub.

5. An electric motor according to claim 1, having a fastening flange area on said mounting plate which has in part, surfaces of a high machining precision.

6. An electric motor according to claim 2, having a fastening flange area on said mounting plate which has in part, surfaces of a high machining precision.

7. An electric motor according to claim 1 wherein said cylindrical hub is made of aluminum.

8. An electric motor according to claim 2 wherein said cylindrical hub is made of aluminum.

9. An electric motor having:
a fastening flange;
a bearing support part made of deformable material;
a rotor surrounding a stator;
the stator having at least one winding end plate and an iron core constructed as a bundle of plates axially secured about an outer diameter of the bearing support part at a side facing away from the fastening flange;
a toothed disk having a central bore surrounding the diameter of the bearing support part and having radially inwardly projecting projection means which are in external contact with the bearing support part to axially fasten the stator to the bearing support part;
wherein the toothed disk has at least one tongue means protruding beyond an outer edge thereof for connecting and aligning the toothed disk to the stator;
wherein the toothed disk is held between the at least one winding end plate of the stator and one of the iron core plates by an electrical winding; and
wherein an exterior outline of the toothed disk has the same contour as said bundle of plates constituting the iron core of the stator.

10. An electric motor having:
a fastening flange;
a bearing support part made of deformable material;
a rotor surrounding a stator;
the stator having at least one winding end plate and an iron core axially secured about an outer diameter of the bearing support part at a side facing away from the fastening flange;
a toothed disk having a central bore surrounding the diameter of the bearing support part and having radially inwardly projecting projection means which are in external contact with the bearing support part to axially fasten the stator to the bearing support part;
wherein the toothed disk is held between the at least one winding end plate and the iron core of the stator by an electrical winding; and
wherein the toothed disk is provided with one or more orienting means to align the toothed disk in the motor.

11. An electric motor according to claim 10, wherein said orienting means are orienting holes.

12. An electric motor according to claim 10, wherein the iron plates constituting the stator iron core have orienting notches, and wherein said orienting means are protrusions oriented in the same direction as said orienting notches on said iron plates of said stator iron core.

13. An electric motor having:
a fastening flange;
a bearing support part made of deformable material;
a rotor surrounding a stator;
the stator having an iron core axially secured about an outer diameter of the bearing support part at a side facing away from the fastening flange;
a toothed disk having a central bore surrounding the diameter of the bearing support part and having radially inwardly projecting projection means which are in external contact with the bearing support part to axially fasten the stator to the bearing support part;
wherein the toothed disk is at least partially coated with a plastic fluidized bed sinter layer, which layer is not present on the toothed disk projection means.

14. An electric motor according to claim 1, wherein said bearings are positioned radially inside of the bearing support.

15. An electric motor according to claim 2, wherein said bearings are positioned radially inside of the bearing support.

16. An electric motor according to claim 10, wherein said bearings are positioned radially inside of the bearing support.

17. An electric motor according to claim 11, wherein said bearings are positioned radially inside of the bearing support.

18. An electric motor according to claim 1, wherein said bearings are positioned radially outside of the bearing support.

19. An electric motor according to claim 2, wherein said bearings are positioned radially outside of the bearing support.

20. An electric motor according to claim 10, wherein said bearings are positioned radially outside of the bearing support.

21. An electric motor according to claim 11, wherein said bearings are positioned radially outside of the bearing support.

22. An electric motor according to claim 14, having centering ribs provided on an inner circumference of the bearing support for centering the bearing.

23. An electric motor according to claim 15, having centering ribs provided on an inner circumference of the bearing support for centering the bearing.

24. An electric motor according to claim 16, having centering ribs provided on an inner circumference of the bearing support for centering the bearing.

25. An electric motor according to claim 17, having centering ribs provided on an inner circumference of the bearing support for centering the bearing.

26. An electric motor according to claim 18, having centering ribs provided on an outer circumference of the bearing support for centering the stator.

27. An electric motor according to claim 19, having centering ribs provided on an outer circumference of the bearing support for centering the stator.

28. An electric motor according to claim 20, having centering ribs provided on an outer circumference of the bearing support for centering the stator.

29. An electric motor according to claim 21, having centering ribs provided on an outer circumference of the bearing support for centering the stator.

30. An electric motor according to claim 1, wherein said bearing support is formed as a hollow cylinder provided with an entrance hole through which coil connection wires are led from the winding into the hollow cylinder to be led out at a lower end of the bearing support.

31. An electric motor according to claim 2, wherein said bearing support is formed as a hollow cylinder provided with an entrance hole through which coil connection wires are led from the winding into the hollow cylinder to be led out at a lower end of the bearing support.

32. An electric motor according to claim 10, wherein said bearing support is formed as a hollow cylinder provided with an entrance hole through which coil connection wires are led from the winding into the hollow cylinder to be led out at a lower end of the bearing support.

33. An electric motor according to claim 11, wherein said bearing support is formed as a hollow cylinder provided with an entrance hole through which coil connection wires are led from the winding into the hollow cylinder to be led out at a lower end of the bearing support.

34. An electric motor according to claim 1, wherein the teeth of the toothed disk are spaced in a non-equidistant angular fashion about the toothed disk.

35. An electric motor according to claim 2, wherein the teeth of the toothed disk are spaced in a non-equidistant angular fashion about the toothed disk.

36. An electric motor according to claim 10, wherein the teeth of the toothed disk are spaced in a non-equidistant angular fashion about the toothed disk.

37. An electric motor according to claim 11, wherein the teeth of the toothed disk are spaced in a non-equidistant angular fashion about the toothed disk.

* * * * *